(12) United States Patent
Cambio (10) Patent No.: US 7,757,429 B1
(45) Date of Patent: Jul. 20, 2010

(54) "Z"-BAR RODENT TRAP AND METHOD OF USE THEREOF

(76) Inventor: Patrick Cambio, 110 Sandalwood Pl., Glendora, CA (US) 91741

( * ) Notice: Subject to any disclaimer, the term of this patent is extended or adjusted under 35 U.S.C. 154(b) by 0 days.

(21) Appl. No.: 12/079,027

(22) Filed: Mar. 24, 2008

(51) Int. Cl.
*A01M 23/36* (2006.01)
(52) U.S. Cl. .............................................. 43/81; 43/82
(58) Field of Classification Search .............. 43/81, 43/81.5, 82; D22/119
See application file for complete search history.

(56) References Cited

U.S. PATENT DOCUMENTS

| | | | | |
|---|---|---|---|---|
| 243,953 | A | * | 7/1881 | Norris ............................. 43/81 |
| 891,880 | A | * | 6/1908 | Timby ............................. 43/82 |
| 1,089,975 | A | * | 3/1914 | Shaw ............................. 43/81 |
| 1,176,778 | A | * | 3/1916 | Rittelmann ..................... 43/81 |
| 2,157,222 | A | * | 5/1939 | Stilson et al. ................... 43/81 |
| 2,462,479 | A | * | 2/1949 | Elleby ............................. 43/81 |
| 2,724,209 | A | | 11/1955 | Cain |
| 3,392,478 | A | * | 7/1968 | Strayline ..................... 43/81.5 |
| 4,245,423 | A | | 1/1981 | Souza et al. |
| 4,403,438 | A | * | 9/1983 | West-Harron .................. 43/81 |
| 5,375,367 | A | | 12/1994 | Pust |
| D441,828 | S | | 5/2001 | Leyerle et al. |
| 6,415,544 | B1 | * | 7/2002 | Leyerle et al. ................. 43/82 |
| 6,655,077 | B1 | | 12/2003 | Trevino |
| 7,162,832 | B2 | | 1/2007 | Simpson et al. |

* cited by examiner

*Primary Examiner*—Christopher P Ellis
(74) *Attorney, Agent, or Firm*—Montgomery Patent and Design; Robert C. Montgomery; Joseph T. Yaksich (57) ABSTRACT invention as presently conceived discloses a spring-loaded, baited mouse/rat/rodent trap device having a zig-zag configured spring trap bar. Although resembling a conventional spring-loaded mouse trap, the snap wire bar is not straight but has a "Z" or zig-zag shape. The zig-zag snap bar provides for a wider capture surface area of as much as an extra half-inch, dependent upon the overall trap dimensions. The bar's overall weight and wind resistance is still minor, and allows the bar to travel at a high rate of speed. The effective wider configuration makes it much more likely that the bar strike some part of the rodent's body resulting in a higher trap or kill ratio.

16 Claims, 6 Drawing Sheets

"Z"-BAR RODENT TRAP AND METHOD OF USE THEREOF

RELATED APPLICATIONS

The present invention was first described in and claims the benefit of Disclosure Document No. 612,396 filed Jan. 30, 2007, the entire disclosures of which are incorporated herein by reference.

FIELD OF THE INVENTION

The present invention describes a method and a device for trapping and eliminating rodents with a spring-loaded "Z"-shaped bar configuration designed to apply a striking force over a greater surface area.

BACKGROUND OF THE INVENTION

The pest control industry has changed dramatically over the last decade. One of these marked changes involves a reduction of the use of chemicals in homes, schools and the workplace in ridding them of pests. Health and well-being has seemed to take center stage in today's society. One of the latest trends regards the consumption of organic foods, so it seems rather counterproductive to employ chemicals in order to eliminate vermin.

Rats, mice and other rodents are indeed persistent problems in almost all areas of the world. In order to control such pests, people have resorted to various methods, including pesticides, to eradicate them. One of the most traditional methods of rodent elimination is now perhaps one that is most in keeping with the latest trends—a trap. In a typical configuration, a spring-loaded bar is held in place with a hair touch trigger typically loaded with bait such as cheese or other types of food. When the rodent attempts to move the bait, the trigger releases the spring which instantly swings the bar around and down upon the rodent thus trapping or killing it. While it is mostly effective, sometimes the bar does miss the rodent, due to the rodent's speed or position. In most cases a wider bar would be of assistance, but the increased weight would slow the movement of the bar down even more.

Accordingly, there exists a need for a means by which the trapping efficiency of a rat or mouse trap can be increased. The development of the "Z"-Bar Rodent Trap fulfills this need.

U.S. Pat. No. 7,162,832 issued to Simpson and Price discloses a rodent snap trap device. This patent does not appear to disclose a device that possesses a zig-zag configured trap bar to increase efficiency of the device.

U.S. Pat. No. 6,655,077 issued to Trevino discloses a trap for a mouse. This patent does not appear to disclose a device that possesses a zig-zag configured trap bar to provide increased efficacy of the device.

U.S. Pat. No. 6,415,544 issued to Leyerle discloses a rodent trap with entrapping teeth. This patent does not appear to disclose a device that possesses a zig-zag configured trap bar to provide increased efficiency of the device.

U.S. Pat. No. 5,375,367 issued to Pust discloses a mousetrap with deep bait receptacle. This patent does not appear to disclose a device that possesses a zig-zag configured trap bar.

U.S. Pat. No. 4,245,423 issued to Sousa and Bumstead discloses an animal trap. This patent does not appear to disclose a device with a zig-zag configured trap bar for increased efficiency.

U.S. Pat. No. 2,724,209 issued to Cain discloses an animal trap. This patent does not appear to disclose a device that possesses a zig-zag configuration on the trap bar and this device does not appear to possess the trap bar range of motion of the instant invention.

The prior art appears to disclose various tools for trapping rodents and animals. The prior art does not appear to disclose a rodent trap with a zig-zag configured trap bar for maximizing trapping efficiency.

SUMMARY OF THE INVENTION

In view of the foregoing disadvantages inherent in the prior art, it has been observed that there is need for a device that efficiently and effectively traps, contains and eliminates rodents.

The spring-loaded, zig-zag configured trap bar rodent trap provides a convenient and efficient device and method for rodent removal and extermination.

The spring-loaded, zig-zag configured trap bar rodent trap is ergonomically designed to apply force over a greater surface area with minimal wind resistance.

The spring-loaded, zig-zag configured trap bar rodent trap comprises a base, bait receiver, coiled spring, and a trap bar.

The device is envisioned to be introduced in a plurality of sizes to accommodate the trapping of various species of rodents.

The device is fabricated of wood, plastic and/or other synthetic materials with the coiled spring and/or the trap bar fabricated of metal.

The spring-loaded, zig-zag configured trap bar rodent trap possesses a base comprising a rectangular design dimensioned in accordance with the type and/or size of the rodent to be exterminated. The base comprises a top face, a bottom face, and four side faces.

The spring-loaded, zig-zag configured trap bar rodent trap possesses a coiled spring to provide the momentum force about a pivoting axis transverse to the length of the base and parallel to the upper side face and lower side face. The coiled spring provides the means to bias a trap bar to an unloaded orientation.

The trap bar is biased rotatably downward from a loaded orientation to an unloaded orientation via the coiled spring but may be pulled apart to form an opening whereas the device may be set to the loaded orientation.

The transverse section of the trap bar is secured in the center section of the coiled spring extending along the same longitudinal axis.

The trap bar comprises a circular cross-section with two (2) lateral members extending from the transverse section forming a zig-zag configuration.

The coiled spring comprises two (2) contact members extending outwardly from each end of said coiled spring. One (1) contact member engages one (1) lateral member and the other contact member contacts the top face of the base thereby providing a means to transform the stored energy of the coiled spring, when in the loaded orientation, to kinetic energy. This kinetic energy provides the momentum force, with the trap bar released, thereby biasing said trap bar in a rotational motion about the axis of the coiled spring, and consequently the axis of the transverse portion of said trap bar, towards a bait receiver.

The zig-zag portion of the trap bar, which is in a parallel arrangement with the transverse portion, rotates about the axis of the spring to contact the rodent. The zig-zag portion of the trap bar comprises a plurality of bar members that are angularly distant from one another in a sinusoidal fashion. The angles between each bar members and/or the lengths of each bar member are envisioned to vary with accordance to user preference and rodent size.

The zig-zag portion of the tarp bar provides an increased coverage area with the length of the bar members as well as the angle between while allowing minute wind resistance of the trap bar while in motion thereby increasing the likelihood of capturing the rodent.

The spring-loaded, zig-zag configured trap bar rodent trap possesses a bait receiver that is a platform for receiving bait such as food and/or other rodent attractants which attract and cause the rodent to be in close proximity to the bait receiver. The distal end of the bait receiver comprises a means to receive a locking bar that extends perpendicularly outward and is rotatably connected to a fastening loop.

The locking bar is rotatably secured thereto the fastening loop via a ring section that engages the fastening loop when the device is in the loaded orientation. In this orientation, the retention of the trap bar charges the coiled spring to provide a stored energy awaiting to be released into kinetic energy and provides a rotational motion to bring the trap bar towards the bait receiver. The locking bar secures the trap bar storing the energy awaiting to be released by the disturbance conducted thereto the bait receiver, releasing the trap bar and actuating the motion of trap bar. This also causes the zig-zag portion of the trap bar to rotate about the longitudinal axis of the trap bar, and move toward the top face of the base.

The spring-loaded, zig-zag configured trap bar rodent trap further comprises spikes or teeth on the trap bar. These spikes or teeth converge to a point in a cone-like shape suitably dimensioned to contact and thereby being removably inserted therein insertion apertures sized to removably receive said teeth. The spikes or teeth are designed to be operably spaced equidistantly apart in at least one (1) row spanning along the curvature of the bar members of the zig-zag portion.

The insertion apertures are drilled through the base and selectively receive the teeth which prevents accidental injury. The insertion apertures are alignable with each designated spike or tooth. The tooth-to-aperture method prevents a shearing motion when the device is in operation to transform from the loaded orientation to the unloaded orientation.

The spring-loaded, zig-zag configured trap bar rodent trap discloses a zig-zag portion on the trap bar without spikes or teeth extruding outwardly therefrom.

The universal joint extracting tool may be used by performing the following steps: putting a rodent attractant, such as food thereon the bait receiver; rotatably motioning the spring-loaded trap bar towards the upper face; engaging the locking bar to releasably secure said trap bar; and, strategically placing the device along a wall, crevice, or other-known areas-by which a rodent is more prone to travel; setting the device for operation by rotating the trap bar against the bias of the coiled spring toward the upper face of the base; securing the trap bar via a locking bar that is in operably engaged with the bait receiver; checking the device periodically to see if the device has captured a rodent; disposing of a trapped rodent in a safe manner; and, benefiting from the increased efficiency of the device and the enhanced health conditions in ones home from rodent elimination with the spring-loaded, zig-zag configured trap bar rodent trap.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | "Z"-bar rodent trap |
| 20 | base |
| 21 | top face |
| 22 | upper side face |
| 23 | lower side face |
| 24 | right side face |
| 25 | left side face |
| 30 | bait receiver |
| 40 | coiled spring |
| 42 | contact member |
| 50 | trap bar |
| 52 | transverse section |
| 53 | lateral member |
| 55 | zig-zag section |
| 57 | bar member |
| 58 | angle |
| 60 | locking bar |
| 65 | fastening loop |
| 67 | ring section |
| 70 | teeth |
| 75 | insertion aperture |

DETAILED DESCRIPTION OF THE PREFERRED EMBODIMENT

The best mode for carrying out the invention is presented in terms of its preferred embodiment, herein depicted within FIGS. 1 through 5b. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and that example configurations shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a mouse, rat, and/or any other rodent trap device having a spring-loaded zig-zag configured spring trap bar 50 ergonomically designed to apply force over a greater surface area whilst still comprising minimal wind resistivity. The "Z"-bar rodent trap (herein described as the "device") 10 comprises a base 20, bait receiver 30, coiled spring 40, and a trap bar 50.

The device 10 is envisioned to be introduced in a plurality of sizes to accommodate the trapping of rodents of a plurality of sizes and shapes. The device 10 is envisioned to be fabricated of wood, plastic and/or other synthetic materials with the coiled spring 40 and/or the trap bar 50 fabricated of a metallic process.

Figure 1:
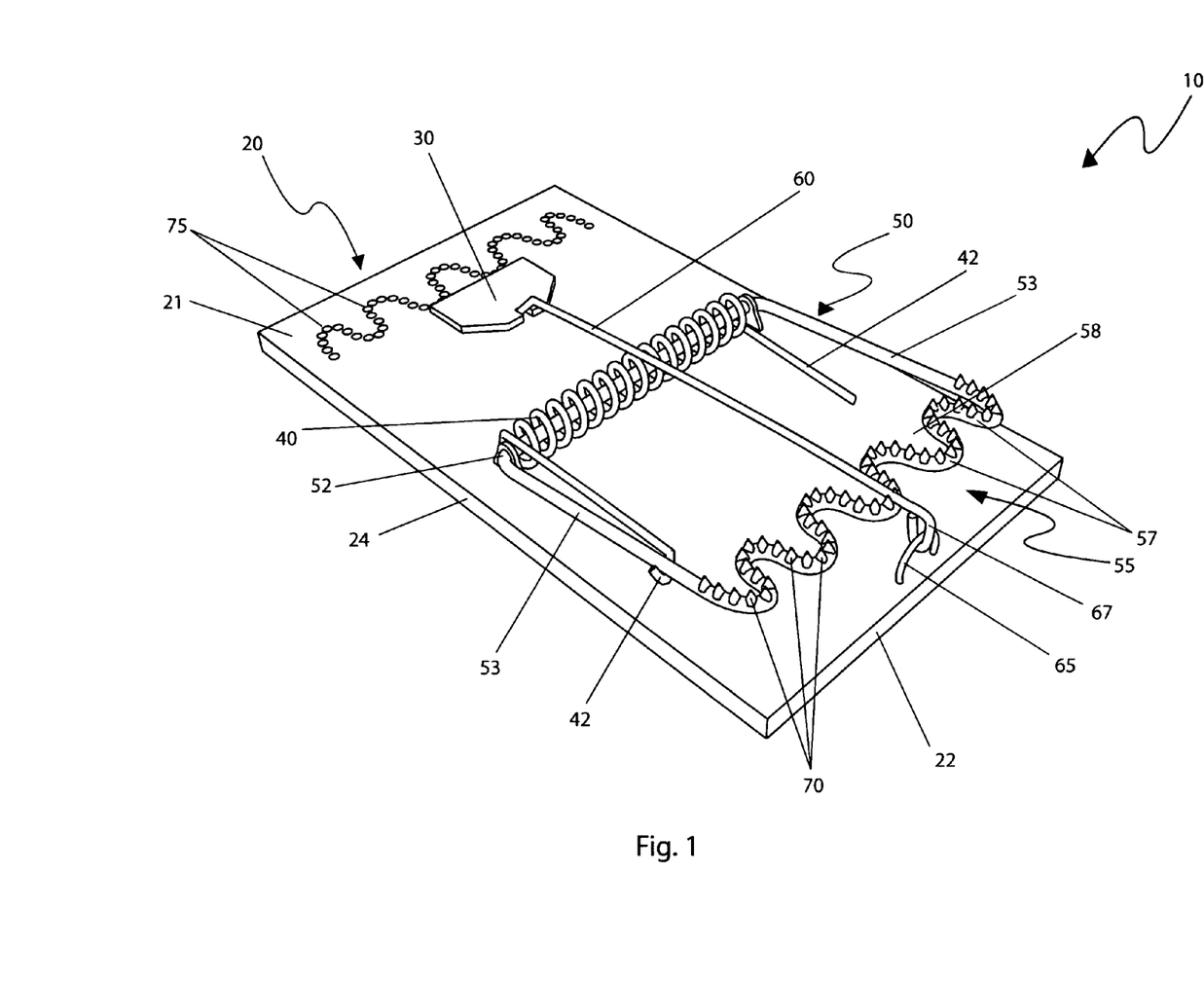
FIG. 1 is a perspective view of a "Z"-bar rodent trap 10 in the loaded orientation, according to the preferred embodiment of the present invention.
Figure 2:
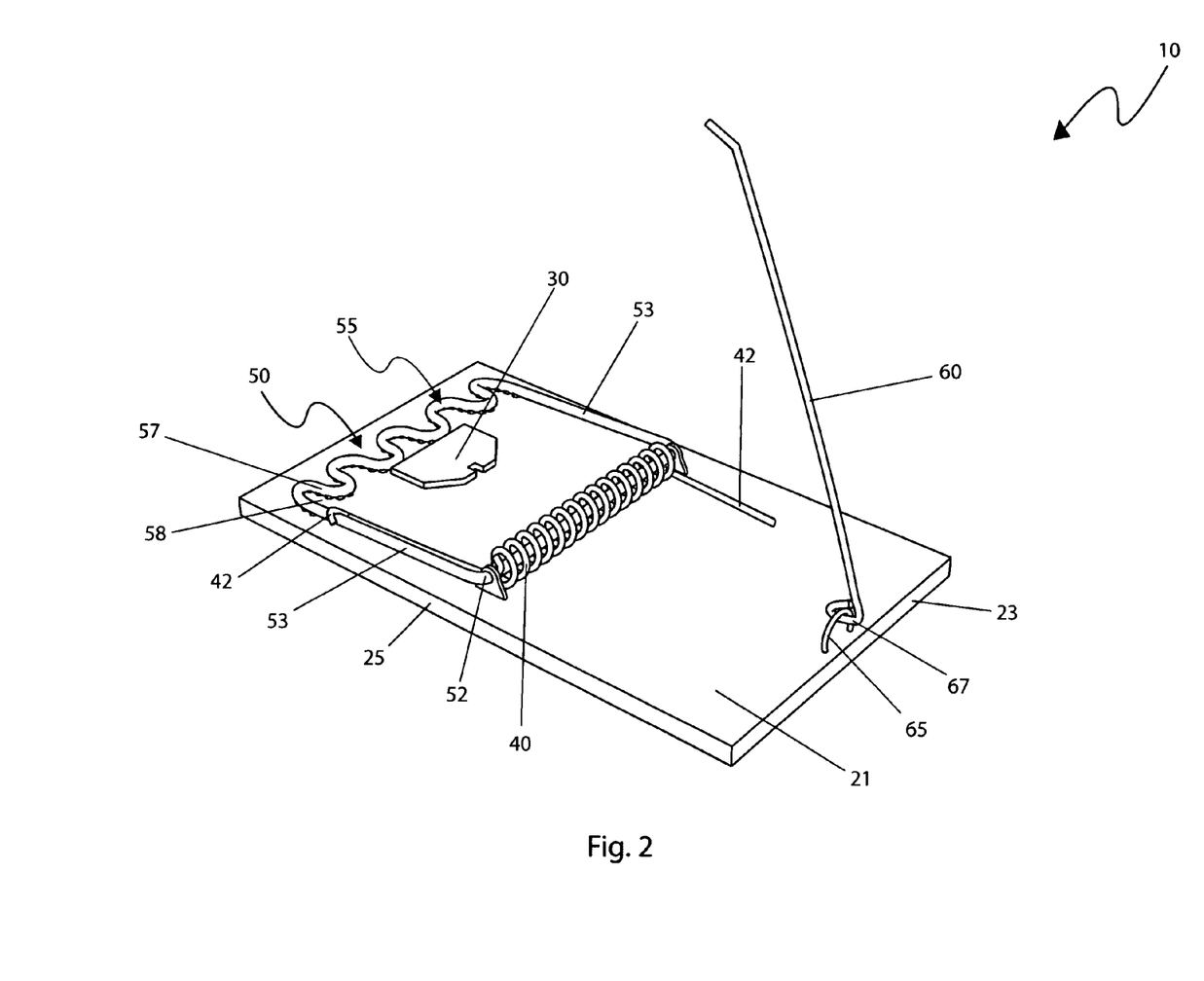
FIG. 2 is a perspective view of the "Z"-bar rodent trap 10 in the unloaded orientation, according to the preferred embodiment of the present invention.

Referring now to FIGS. 1 and 2, perspective views of the device 10 are disclosed, according to the preferred embodiment of the present invention. The device 10 comprises a base 20 of rectangular design dimensioned in accordance with the type and/or size of the rodent to be exterminated. The base 20 comprises a top face 21, a bottom face (not pictured), and four (4) side faces 22, 23, 24, 25. A coiled spring 40 is envisioned to be utilized to provide the momentum force about a pivoting axis transverse thereto the length of the base 20 as well as parallel thereto the upper side face 22 and lower side face 23. The coiled spring 40 provides the means to bias a trap bar 50 to an unloaded orientation. The trap bar 50 is biased rotatably downward from a loaded orientation, as depicted in FIG. 1, to an unloaded orientation, as depicted in FIG. 2, via the coiled spring 40 but may be pulled apart to form an opening whereas the device 10 may be then set to the loaded orientation.

The transverse section 52 of the trap bar 50 is secured therein the center section of the coiled spring 40 extending therealong the same longitudinal axis. The trap bar 50 is envisioned to comprise a circular cross-section with two (2) lateral members 53 extending from the transverse section 52 perpendiculary thereto leading towards a zig-zag configuration 55. The coiled spring 40 comprises two (2) contact members 42 extending outwardly therefrom each end of said coiled spring 40. One (1) contact member 42 engages one (1) lateral member 53 and the other contact member 42 contacts the top face 21 of the base 20 thereby providing a means to transform the stored energy of the coiled spring 40, when in the loaded orientation, to kinetic energy. The kinetic energy provides the momentum force, with the trap bar 50 released, thereby biasing said trap bar 50 in a rotational motion about the axis of the coiled spring 40, and consequently the axis of the transverse portion 52 of said trap bar 50, towards a bait receiver 30. When in the loaded orientation, the contact members 42 instigate tension along the axis of the spring 40.

Figure 3:
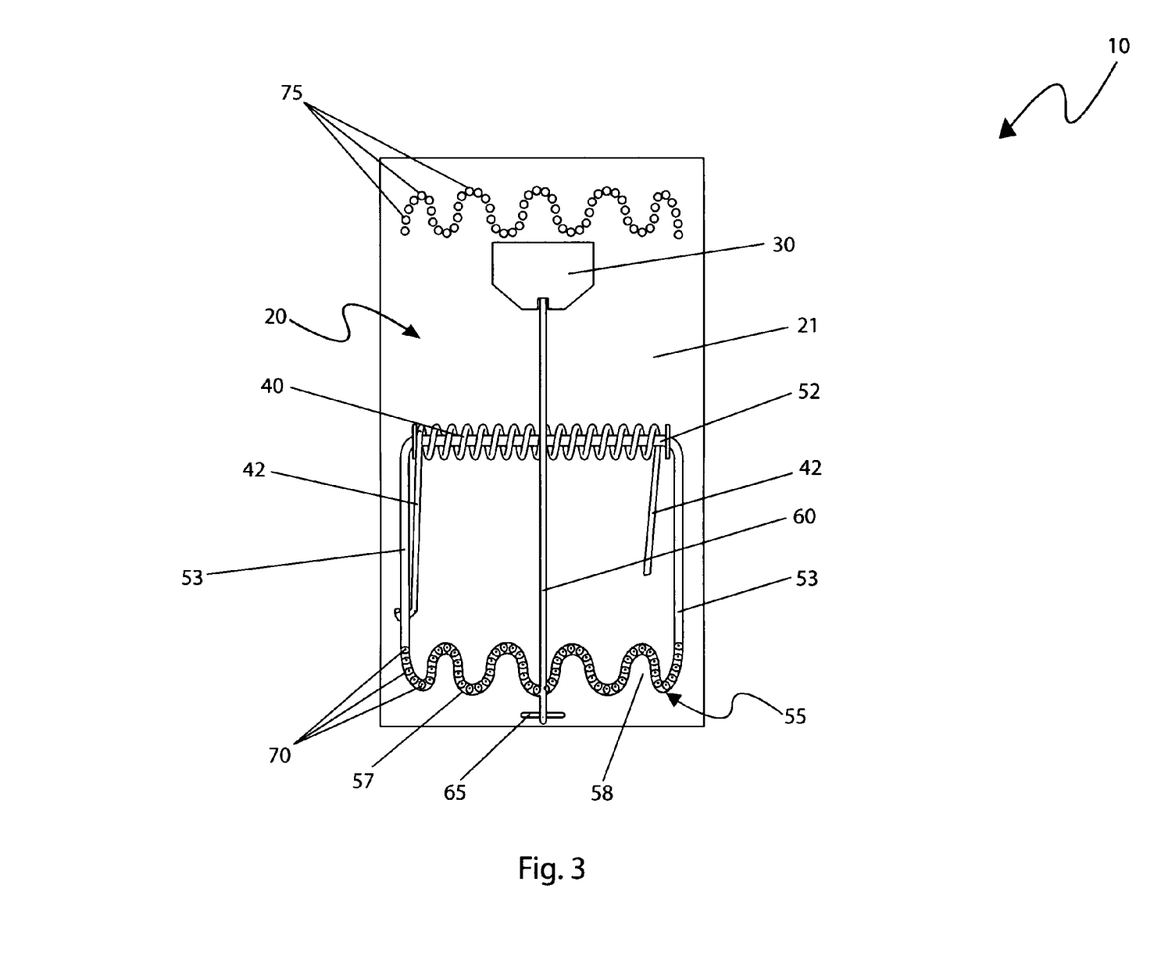
FIG. 3 is a top view the "Z"-bar rodent trap 10, according to the preferred embodiment of the present invention.
Figure 4:
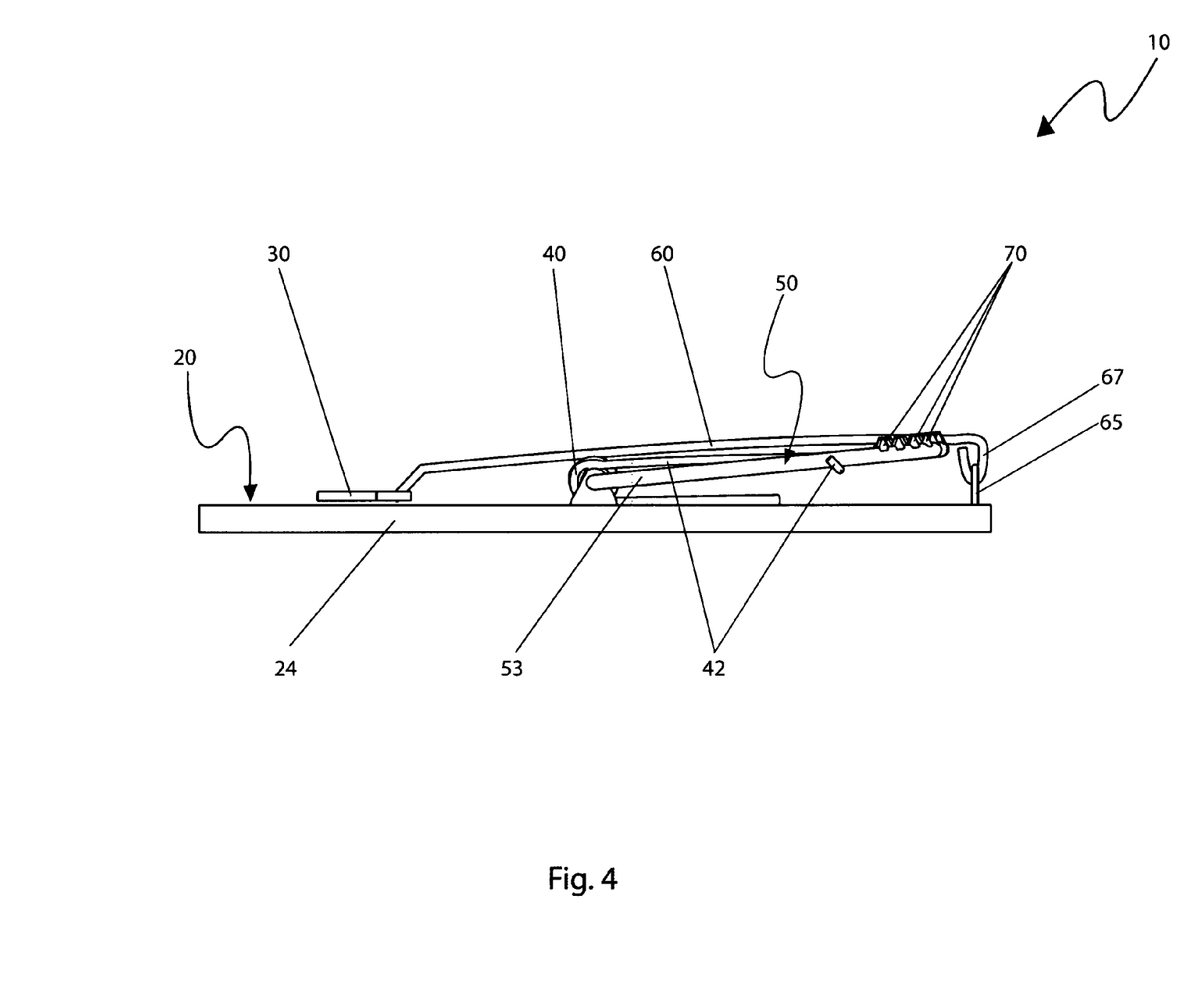
FIG. 4 is a side view of the "Z"-bar rodent trap 10, according to the preferred embodiment of the present invention.

Referring now to FIGS. 3 and 4, views of the device 10 are disclosed, according to the preferred embodiment of the present invention. The zig-zag portion 55 of the trap bar 50, which is in a parallel arrangement therewith the transverse portion 52, rotates about the axis of the spring 40 to contact the rodent. The zig-zag portion 55 of the trap bar 50 comprises a plurality of bar members 57 that are angularly distant therefrom one (1) another in a sinusoidal fashion. The angles 58 therebetween each said bar members 57 and/or the lengths of each bar member 57 are envisioned to vary with accordance to user preference, rodent size, and the like. The zig-zag portion 55 introduces an increased coverage area with the length of the bar members 57 as well as the angle 58 therebetween while allowing minute wind resistance of the trap bar 50 while in motion thereby increasing the likelihood of catching the rodent.

The bait receiver 30 defines a platform for receiving bait such as food and/or other rodent attractants to appeal to the rodent to become in close proximity thereto. The distal end of the bait receiver 30 comprises a means to releasably receive a locking bar 60 that extends perpendicularly outward that is rotatably connected thereto a fastening loop 65 for securement thereto. The locking bar 60 is rotatably secured thereto the fastening loop 65 via a ring section 67 that engages said fastening loop 65 while the device 10 is in the loaded orientation. In the loaded orientation, the retention of the trap bar 50 charges the coiled spring 40 such to provide a stored energy awaiting to be released into kinetic energy such to provide a rotational motion to bring forth the trap bar 50 towards the bait receiver 30. The locking bar 60 secures the trap, bar 50 thereby storing the energy awaiting to be released by the disturbance conducted thereto the bait receiver 30 thereby releasing the trap bar 50 and actuating the motion of said trap bar 50. Upon depression of the bait receiver 30, the locking bar 60 releases the spring-loaded trap bar 50 allowing the zig-zag portion 55 of said trap bar 50 to rotate about the longitudinal axis of the transverse section 52 of said trap bar 50, thereby causing the mutually facing surfaces of said zig-zag portion 55 to move toward the top face 21 of the base 20.

Figure 5A:
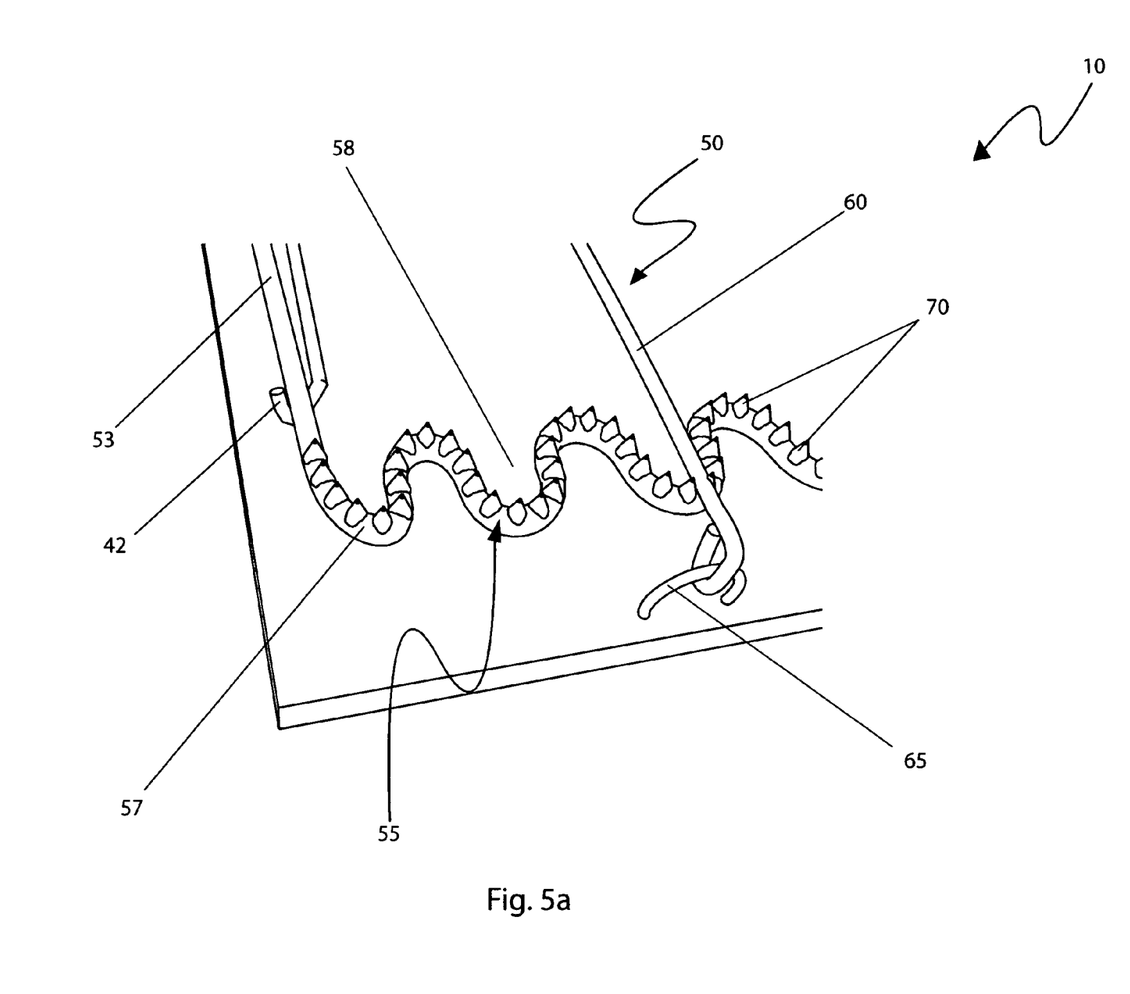
FIG. 5a is a close-up view of a zig-zag section 55 with teeth 70 protruding therefrom, according to the preferred embodiment of the present invention; and, FIG. 5b is a close up view of a top face 21 of a base 20 with insertion apertures 75 drilled therethrough, according to the preferred embodiment of the present invention.
Figure 5B:
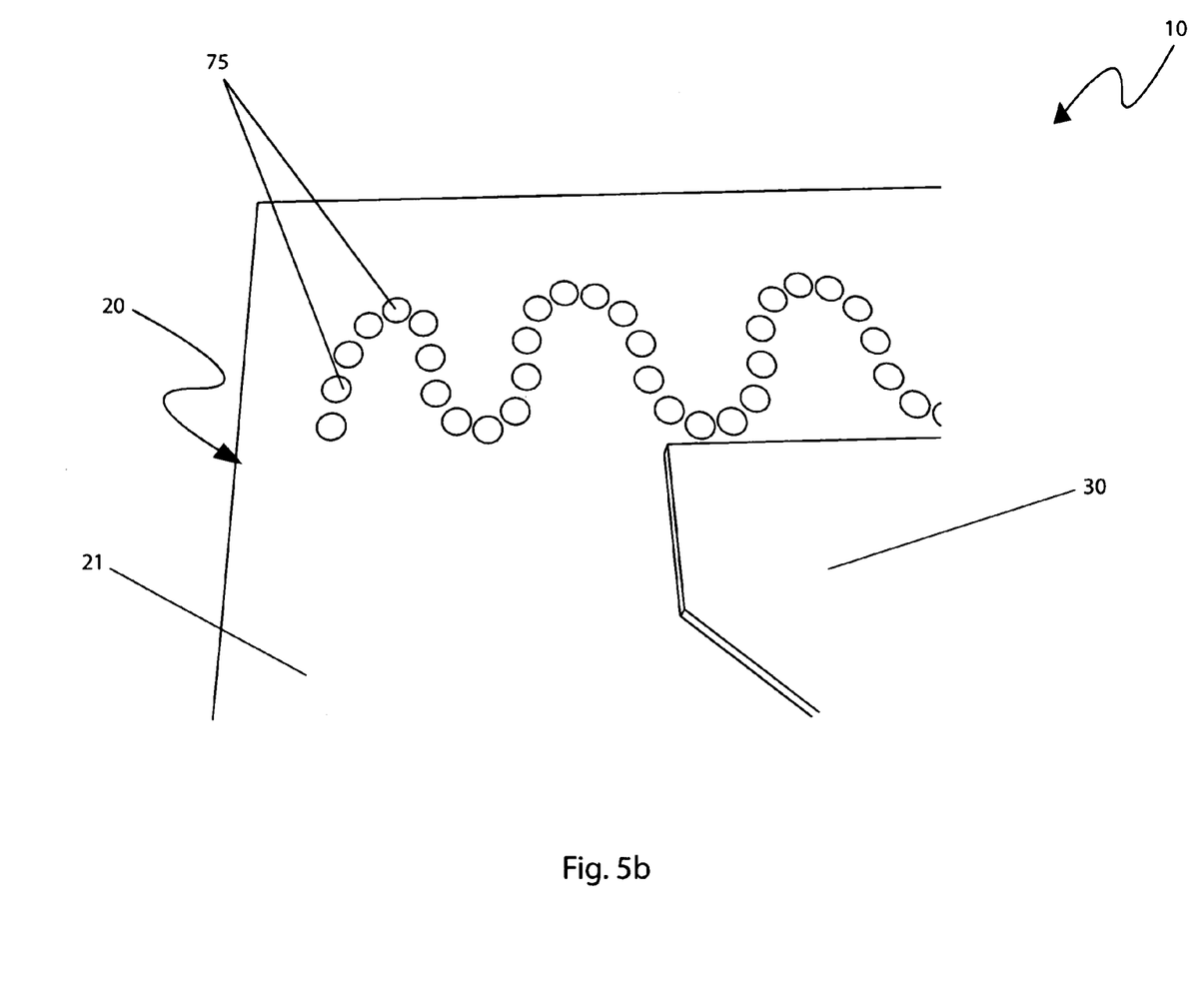

Referring now to FIGS. 5a and 5b, close-up top views of the device 10 are disclosed, according to the preferred embodiment of the present invention. The spikes or teeth 70 are envisioned to converge to a point in a cone-like shape suitably dimensioned to contact and thereby being removably inserted therein insertion apertures 75 sized to removably receive said teeth 70. The teeth 70 are designed to be operably spaced equidistantly apart therefrom in at least one (1) row spanning along the curvature of the bar members 57 of the zig-zag portion 55. The insertion apertures 75 are drilled therethrough the base 20 for selectively receiving the teeth 70 while not in use thereby preventing accidental injury thereof. The insertion apertures 75 are alignable with each designated spike or tooth 70. The tooth-to-aperture method prevents a shearing motion when the device 10 is in operation to transform from the loaded orientation to the unloaded orientation.

An alternate embodiment of the present invention may disclose a zig-zag portion 55 without teeth 70 extruding outwardly therefrom.

The preferred embodiment of the present invention can be utilized by the common user in a simple and effortless manner with little or no training. The present invention describes a means by which a rodent may be trapped and thereby exterminated in the most efficient manner. After initial purchase or acquisition of the device 10, it would be configured as indicated in FIGS. 1 through 5b.

The method of utilizing the device may be achieved by performing the following steps: putting a rodent attractant, such as food thereon the bait receiver 30; rotatably motioning the spring-loaded trap bar 50 towards the upper face 22; engaging the locking bar 60 to releasably secure said trap bar 50; and, strategically placing the device 10 along a wall, crevice, or other known areas by which a rodent is more prone to travel.

To set the device 10 into the loaded orientation, the trap bar 50 is rotated against the bias of the coiled spring 40 toward the upper face 22 of the base 20. The contact members 42 of the coiled spring 40 causes a resistive force transferred from said coiled spring 40. The trap bar 50 is releasably secured via a locking bar 60 that is in operable engagement therewith the bate receiver 30. Thus, when the locking bar 60 is engaged with the bait receiver 30 in the loaded orientation, the trap bar 50 is tilted slightly resting thereagainst said locking bar 60.

When a rodent contacts the bait receiver 30, the locking bar 60 releases the stored energy of the coiled spring 40 thereby allowing the trap bar 50 to rotate towards said bait receiver 30. Further, teeth 70 are provided to exterminate the rodent in a quicker and more humane fashion. Insertion apertures 75 are provided in relation to said teeth 70 for operably receiving, especially for the stowage or unloaded orientation. The exterminated rodent may then be released from the device 10 by simply motioning the trap bar 50 away from the bait receiver 30 toward the upper face 22 of the base 20.

The zig-zag configuration section 55 provides for a wider capture surface without the additional wind or weight resistance thereby allowing the trap bar 50 to travel at a high rate of speed. The effective wider configuration makes it much more likely that said trap bar 50 to strike some part of the rodent's body resulting in a higher trap or kill ratio.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A rodent trap for applying an impact force over a greater surface area while incurring minimal wind resistance, said rodent trap comprising:
   a base;
   a trap bar pivotally coupled to said base and having first and second lateral members and a distally located zig-zag section;
   said zig-zag section consisting of a third member sinusoidally extending from said first lateral member to said second lateral member;
   a bait receiver attached to a proximal end of said base for receiving bait thereon, further comprising a notch;
   a locking bar pivotally anchored to a distal end of said base and extending over said trap bar when said trap bar is disposed at an open position; and,
   a coiled spring helically wound about said trap bar and being selectively adapted between tensed and equilibrium positions to thereby articulate said trap from said open position to a closed position;
   wherein said locking bar is removably positioned in said notch; and,
   wherein said bait receiver remains attached to said proximal end of said base when said locking bar is released from said bait receiver.

2. The rodent trap of claim 1, wherein said locking bar has distal and proximal ends respectively pivotal about an axis situated at said distal end of said base and removably coupled to said bait receiver.

3. The rodent trap of claim 2, wherein said locking bar is pivoted about said distal end of said base and thereby releases said trap bar along a rotational path defined about a fulcrum axis traversing across a width of said base.

4. The rodent trap of claim 3, wherein said trap bar comprises: a rectilinear transverse section extending along the fulcrum axis and secured to said coiled spring in such a manner that said transverse section axially passes through an entire longitudinal length of said coiled spring.

5. The rodent trap of claim 4, wherein said trap bar further comprises: a plurality of lateral members extending distally from said transverse section and being oriented perpendicular thereto.

6. The rodent trap of claim 5, wherein said coiled spring further comprises: a plurality of contact members extending outwardly from each end thereof in such a manner that one of said contact members engages a corresponding one of said lateral members while another one of said contact members engages a top face of said base.

7. The rodent trap of claim 1, wherein said zig-zag portion of said trap bar comprises:
   a plurality of curvilinear bar members that are angularly disposed in a substantially sinusoidal pattern;
   a plurality of teeth attached to said curvilinear bars and juxtaposed therealong; and,
   a plurality of apertures formed in a proximal end of said base and being aligned with said teeth such that each of said teeth selectively interfits within a corresponding one of said apertures when said trap bar is articulated to the closed position and thereby prevents shearing movement between said teeth and said proximal end of said base.

8. A rodent trap for applying an impact force over a greater surface area while incurring minimal wind resistance, said rodent trap comprising:
   a base;
   a trap bar pivotally coupled to said base and having first and second lateral members and a distally located zig-zag section said zig-zag section consisting of a third member sinusoidally extending from said first lateral member to said second lateral member;
   a bait receiver attached to a proximal end of said base for receiving bait thereon, further comprising a notch;
   a locking bar pivotally anchored to a distal end of said base and extending over said trap bar when said trap bar is disposed at an open position, said locking bar being detachably engaged with said bait receiver; and,
   a coiled spring helically wound about said trap bar and being selectively adapted between tensed and equilibrium positions to thereby articulate said trap from the open position to a closed position;
   wherein said locking bar is removably positioned in said notch; and,
   wherein said bait receiver remains attached to said proximal end of said base when said locking bar is released from said bait receiver.

9. The rodent trap of claim 8, wherein said locking bar has distal and proximal ends respectively pivotal about an axis situated at said distal end of said base and removably coupled to said bait receiver.

10. The rodent trap of claim 9, wherein said locking bar is pivoted about said distal end of said base and thereby releases said trap bar along a rotational path defined about a fulcrum axis traversing across a width of said base.

11. The rodent trap of claim 10, wherein said trap bar comprises: a rectilinear transverse section extending along the fulcrum axis and secured to said coiled spring in such a manner that said transverse section axially passes through an entire longitudinal length of said coiled spring.

12. The rodent trap of claim 11, wherein said trap bar further comprises: a plurality of lateral members extending distally from said transverse section and being oriented perpendicular thereto.

13. The rodent trap of claim 12, wherein said coiled spring further comprises: a plurality of contact members extending outwardly from each end thereof in such a manner that one of said contact members engages a corresponding one of said lateral members while another one of said contact members engages a top face of said base.

14. The rodent trap of claim 8, wherein said zig-zag portion of said trap bar comprises:
   a plurality of curvilinear bar members that are angularly disposed in a substantially sinusoidal pattern;

a plurality of teeth attached to said curvilinear bars and juxtaposed therealong; and, a plurality of apertures formed in a proximal end of said base and being aligned with said teeth such that each of said teeth selectively interfits within a corresponding one of said apertures when said trap bar is articulated to the closed position and thereby prevents shearing movement between said teeth and said proximal end of said base.

15. A method for trapping a rodent, said method comprising the steps of:

providing a base, a bait receiver comprising a notch, a coiled spring, and a trap bar having first and second lateral members and a zig-zag portion said zig-zag section consisting of a third member sinusoidally extending from said first lateral member to said second lateral member;

putting bait on said bait receiver;

rotatably motioning said trap bar about said coiled spring and towards a distal end of said base;

providing and engaging a locking bar with said notch of said bait receiver to releasably secure said trap bar at an open position; and, strategically placing said base at a desired location;

wherein said locking bar is removably positioned in said notch; and, wherein said bait receiver remains attached to said proximal end of said base when said locking bar is released from said bait receiver.

16. The method of claim 15, further comprising the steps of:

setting said trap bar into a loaded orientation by rotating said trap bar against a tension of said coiled spring; and, when a rodent contacts said bait receiver, quickly releasing said locking bar along a rotational path towards said bait receiver such that said zig-zag portion of said trap bar directly engages and traps the rodent.

* * * * *